W. R. MACDONALD.
ELECTRIC MOTOR.
APPLICATION FILED DEC. 15, 1911.
1,216,242.
Patented Feb. 13, 1917.
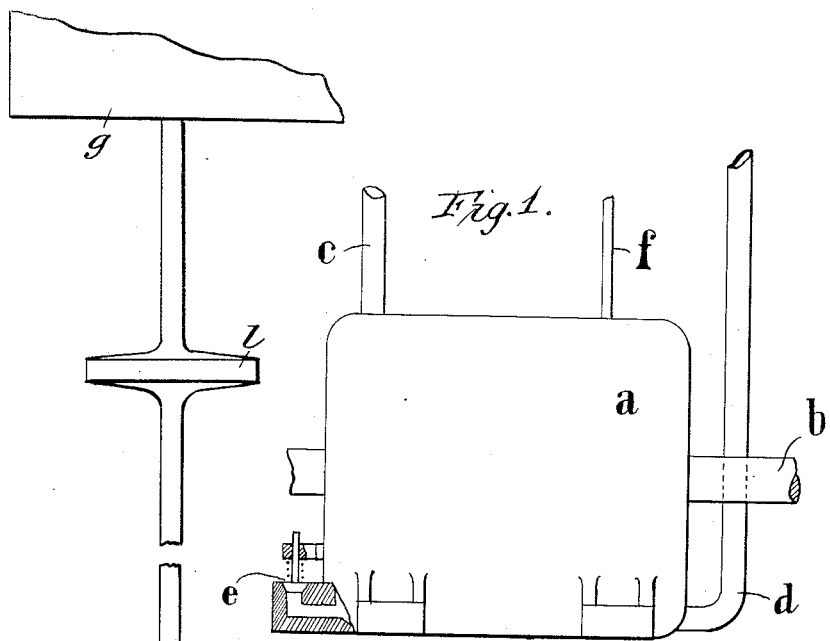
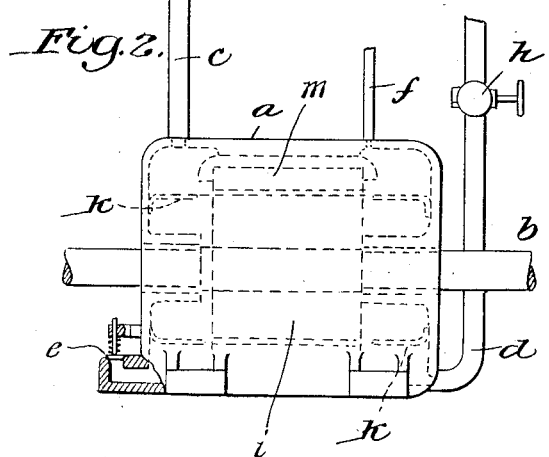
WITNESSES.
INVENTOR.
WILLIAM. RICHARD. MACDONALD.
per
ATTORNEY.

UNITED STATES PATENT OFFICE.

WILLIAM RICHARD MACDONALD, OF LONDON, ENGLAND.

ELECTRIC MOTOR.

1,216,242.  Specification of Letters Patent.  Patented Feb. 13, 1917.

Application filed December 15, 1911. Serial No. 665,890.

*To all whom it may concern:*

Be it known that I, WILLIAM RICHARD MACDONALD, a subject of the King of Great Britain, residing at 49 Queen Victoria street, in the city of London, England, but formerly of 13 Weymouth street, Portland Place, London, have invented new and useful Improvements in Electric Motors, of which the following is a specification.

This invention relates to electric motors adapted for working under water. The purpose of the invention is to widen the range of usefulness of such motors by enabling them to work in dirty or saline water, or when not submerged at all.

To this end the invention aims to provide a motor which has windings and bearings that are not liable to damage by water and which is generally capable of operation when submerged, with a casing forming a substantially total inclosure. It is not of the essence of this invention that such casing should be absolutely water-tight.

The invention further designs to provide means for supplying water to such a casing, from a source other than the fluid in which the motor may be immersed. It contemplates therefore a provision of supply and waste pipes on the motor casing. Moreover to further insure the motor against ingress of impure water from without, the supply of fresh or substantially pure water within the casing may be maintained at a pressure higher than that external to the motor.

Since circumstances arise in which a motor designed as aforesaid may be able to work unsubmerged and since there are certain advantages in so working, notably diminution of "windage" losses, it is a further purpose of this invention to enable the motor casing to be emptied of water in such circumstances and to be kept free of water. With this in view the means are provided by which air under pressure may be supplied to the casing.

In the accompanying drawing Figures 1 and 2 show diagrammatically a motor designed to fulfil the purpose of this invention.

In this drawing, $a$ is the casing of the motor which forms a complete but not necessarily water-tight inclosure, and $b$ is the shaft extending from the motor and connected to the pump or other device to be driven. A pipe $c$ extends from a suitable source $g$ of substantially pure water for cooling purposes and after passing through the filter $l$ it enters the motor casing $a$ and supplies cooling water thereto. This water ultimately escapes by way of the pipe $d$. If desired the pipe $d$ may be partially obstructed, for example, by a valve $h$ so that there is a slight pressure in the interior of the motor casing $a$. If then any leakage occurs it will be from within outward. If desired there may be suitable division plates or baffles $k$ designed as directing means for guiding the cooling water into contact with the windings of the field magnets $m$ or the armature $i$. Thus these baffles fixed inside the casing guide the circulating water in the most effective manner over the parts where heat is most liable to generate. If the source from which circulating water is obtained for injection into the interior is impure the filter $l$ in the inlet pipe $c$ serves to remove the impurity.

To permit of the motor casing being emptied when it is convenient to run the motor without circulating water, a suitable one-way valve $e$ is provided which will open outward when a predetermined pressure is attained in the interior. Compressed air may be forced into the motor casing through the connection $f$, or if desired through one of the water circulating pipes $c$ or $d$. By this means any liquid in the casing may be forced out through the valve $e$, and if the pressure in the interior is maintained the impure liquid around the motor will be prevented from entering. This method of working is useful in starting the motor and in running it when it is submerged in cold but impure water, especially if the water is flowing so as to carry away the heat quickly.

What I claim is:—

1. In combination, an electric motor, an inclosed casing therefor provided with an outlet near the bottom, a water inlet and means connected therewith adapted to be connected to a water-supply for the purpose of cooling the motor, and an air inlet adapted to admit compressed air for the purpose of expelling the water through said outlet at will, whereby the motor may be enveloped in water or in air at the will of the operator.

2. In combination, an electric motor, an inclosed casing therefor, a water inlet and means connected therewith adapted to be connected to a water-supply for the purpose of cooling the motor, an outlet adjacent the bottom of the casing provided with a valve adapted to operate under maintained pressure, and an air inlet adapted to admit compressed air for the purpose of expelling the water through said outlet at will, whereby the motor may be enveloped in water or in air at the will of the operator.

3. A method of operating an incased electric motor, consisting in admitting compressed air to the casing of said motor during the starting period, cutting off said supply of compressed air and admitting substantially pure water into contact with the windings of said motor during the running.

4. A method of operating an incased electric motor, consisting in admitting compressed air to the casing of the motor during the starting period, and admitting substantially pure water into contact with the windings of the motor during normal running.

In testimony whereof I have signed my name to this specification in the presence of two subscribing witnesses.

WILLIAM RICHARD MACDONALD.

Witnesses:
CYRIL KENRICK HICKMAN,
LEONARD E. HAYNES.